(12) United States Patent
Goldman

(10) Patent No.: US 6,511,606 B2
(45) Date of Patent: Jan. 28, 2003

(54) SIMPLE, ECONOMICAL AND RAPID METHOD FOR DETERMINING THE CONTAMINATE PARTICLE SIZE IN FLUIDS BEING FILTERED

(75) Inventor: Sidney Goldman, Boca Raton, FL (US)

(73) Assignee: Mechanical Manufacturing Corp., Sunrise, FL (US)

( * ) Notice: Subject to any disclaimer, the term of this patent is extended or adjusted under 35 U.S.C. 154(b) by 54 days.

(21) Appl. No.: 09/859,302

(22) Filed: May 18, 2001

(65) Prior Publication Data

US 2001/0035380 A1 Nov. 1, 2001

Related U.S. Application Data

(63) Continuation-in-part of application No. 09/346,898, filed on Jul. 2, 1999, now abandoned.

(51) Int. Cl.⁷ .............................................. B01D 37/00
(52) U.S. Cl. ........................... 210/767; 210/85; 210/92; 210/484; 210/485; 210/489; 73/61.72; 73/863.23
(58) Field of Search ............................ 210/767, 85, 86, 210/87, 92, 93, 483, 484, 488, 489, 485, 496; 73/53.01, 61.41, 61.71, 61.72, 61.73, 863, 863.21, 863.23

(56) References Cited

U.S. PATENT DOCUMENTS

| | | |
|---|---|---|
| 4,371,436 A | 2/1983 | Farber |
| 5,417,855 A | 5/1995 | Gershenson |

Primary Examiner—Robert J. Popovics
(74) Attorney, Agent, or Firm—Martin Sachs, Esq.

(57) ABSTRACT

A simple, economical acid rapid method for determining the contaminate particle size appearing in a fluid being filtered includes a filter housing that eliminates fluid bypass with a multi-layered laminated filter disposed therein.

7 Claims, 2 Drawing Sheets

US 6,511,606 B2

SIMPLE, ECONOMICAL AND RAPID METHOD FOR DETERMINING THE CONTAMINATE PARTICLE SIZE IN FLUIDS BEING FILTERED

The present application is a continuation-in-part of Application Ser. No. 09/346,898 filed Jul. 2, 1999 now abandoned.

BACKGROUND OF THE INVENTION

1. Field of the Invention

The present invention relates to pressurized filter housings, and more particularly, to a simple, economical and rapid method for determining the contaminate particle size appearing in a fluid being filtered.

2. Discussion of the Relevant Art

The prior art discloses devices used in continuously operated filter systems, such as that disclosed in U.S. Pat. No. 5,417,855 issued to Gershenson on May 23, 1995, which utilizes a filter bag having five diametrically and axially spaced bags that form five spaced chambers provided by an integral collar that has a stepped shape forming five cylinder support portions for the five spaced bags.

Another apparatus is disclosed in U.S. Pat. No. 4,371,436 issued to Farber on Feb. 1, 1983, which utilizes a series of trays having successively smaller porosity through which the spent solutions are passed. Each tray removing particulate matter of progressively smaller sizes suspended in the liquid from passing therethrough.

SUMMARY OF THE INVENTION

Therefore, it is an object of the present invention to overcome the shortcomings of the prior art and provide a simple, economical and rapid method, utilizing a single unitary multi-layered filter bag with different porosities, to determine the particulate matter appearing in a fluid being filtered.

It is another object of the present invention to provide a simple method, that utilizes a relatively inexpensive filter bag apparatus for determining the size of the unwanted particles appearing in a filtered liquid.

It is yet another object of the present invention to provide a method of determining the size of undesirable particulate matter appearing in a liquid utilizing a filter bag that consists of a plurality of filter layers, with each filter layer selectively chosen to filter out particulate having a specific size.

It is still yet another object of the present invention to provide an economical and rapid method for determining the size of particulate impurities appearing in a fluid.

A simple and rapid method for determining the size of undesirable particulate matter appearing in a filtered liquid, utilizing a filter bag that consists of a plurality of filter layers, with each filter layer selectively chosen to filter out particulate having a specific size.

A method for rapidly determining the particulate size of impurities appearing in a fluid, according to the principles of the present invention, includes a filter bag having multiple layers inserted into a pressurized filter system, into which a sample amount of the liquid is fed.

The foregoing and other objects and advantages will appear from the description to follow. In the description, reference is made to the accompanying drawing, which forms a part hereof, and in which is shown by way of illustration a specific method and embodiment in which the invention may be practiced. This method will be described in sufficient detail to enable those skilled in the art to practice the invention, and it is to be understood that other methods and embodiments may be utilized and that structural changes may be made without departing from the scope of the invention. The following detailed method and description is, therefore, not to be taken in a limiting sense, and the scope of the present invention is best defined by the appended claims.

The subject matter which I regard as my invention is particularly pointed out and distinctly claimed at the concluding portion of the specification. My invention, itself, however both as to its organization and method of operation, together with further objects and advantages thereof may best be understood by reference of the following description taken in connection with the accompanying drawing.

BRIEF DESCRIPTION OF THE DRAWING

In order that the invention may be more fully understood, it will now be described, by way of example, with reference to accompanying drawing in which.

DESCRIPTION OF THE PREFERRED EMBODIMENT

Applicant hereby incorporates U.S. Pat. No. 5,246,581, issued May 21, 1993 and U.S. Pat. No. 5,770,077 issued Jun. 23, 1998, to Sidney Goldman as hereinbefore set forth at length.

Figure 1:
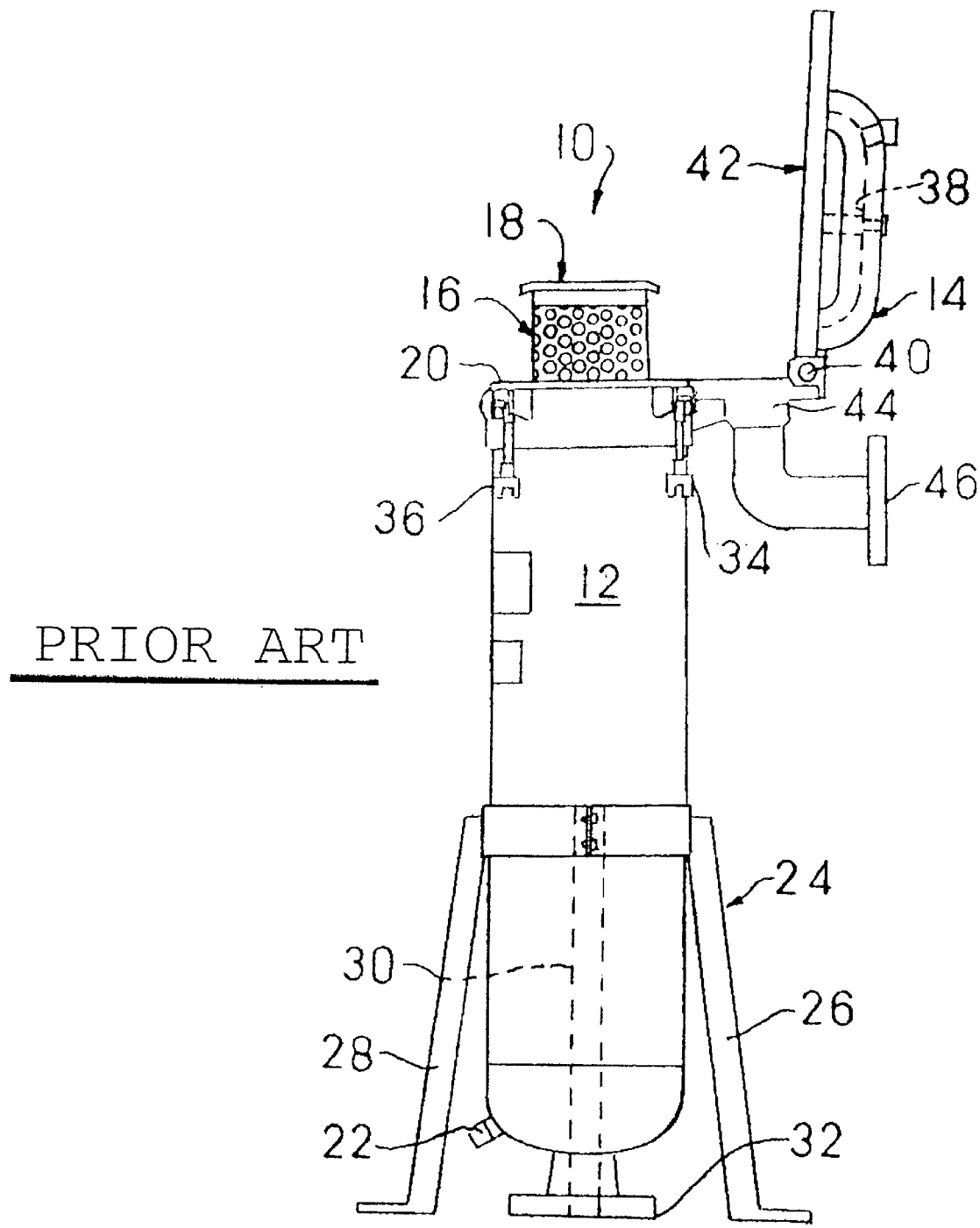
FIG. 1 is a pictorial side view, in elevation of a pressurized filter vessel, with its top cover open and a filter basket extending upwardly therefrom, according to the principals of the present invention.

Referring now to the figures, and in particular to FIG. 1, there is shown, according to the principals of the present invention, a pressurized filter vessel 10 that includes a filter housing 12 and a filter basket 16 into which is inserted a filter bag 18, in a conventional manner.

The end of the filter vessel 12 is provided with an opening 20 that is covered and sealed by a cover 40 by plurality of conventional clamping mechanisms 34 and 36.

The cover 42 is shown in the open position and is hingedly fastened by means of a pivot pin 40 to the vessel housing 12 on an extending lip portion 44 provided proximate the filter vessel opening 20. The cover 20 is also provided with a handle 14 for ease in raising it to the open position.

The inlet port 46 to the housing 12, in the preferred embodiment, communicates with the aperture 38 provided in the cover 42 so that the input fluid to be filtered flows over the top of the filter basket 18 when entering the filter vessel housing 12. The outlet port 22 is provided proximate the closed portion of the filter vessel housing 12, preferably below the bottom of the filter basket 16.

An inlet control valve not shown, is disposed in series with the filter vessel input port 46 and it is connected to the main fluid line, not shown, in which the unfiltered fluid flows. An outlet control valve, not shown, is disposed in series with the filter vessel output port 22 and it is connected to the main fluid line 46 in which the filtered fluid flows. The filter vessel housing 12 is maintained in an upright position by a base member 24, which includes legs 26, 28, 30, 32.

Figure 2:
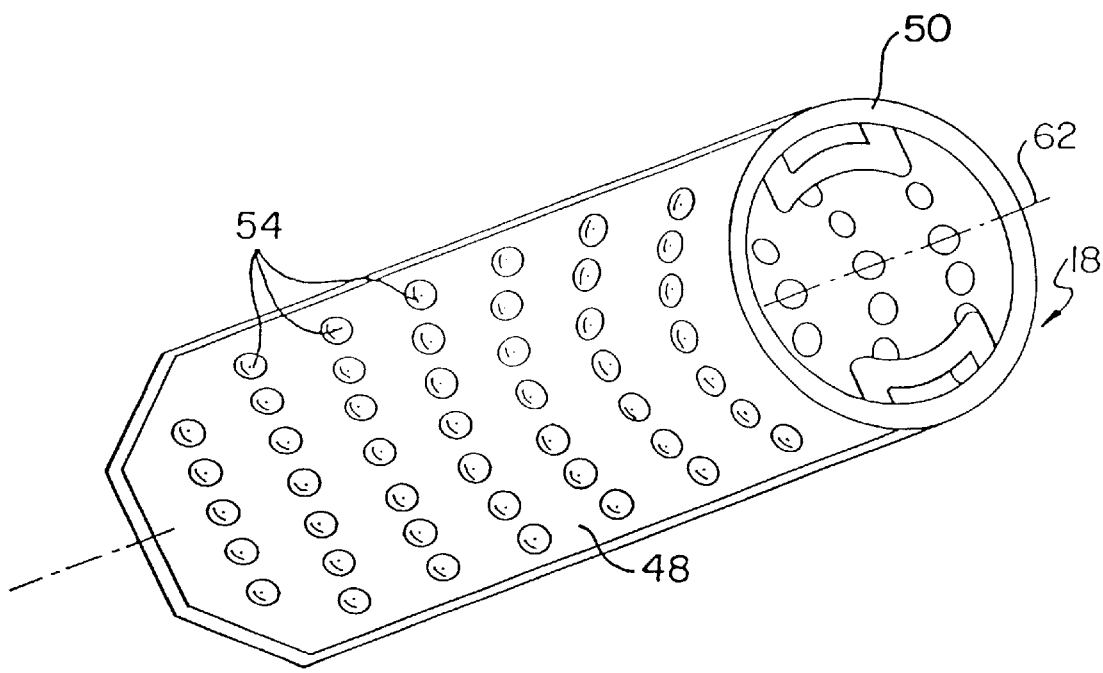
FIG. 2 is a perspective view of a laminated filter bag including the laminated filter material affixed to a ring portion, which has been attached with heat techniques.

Referring now to FIG. 2, which is a perspective view of a multi-layered heat laminated filter bag 18 fabricated from a plurality of different porosity filter materials 48 affixed to a sealing ring portion 50, which has been attached with heat techniques. Disposed along the length and width of the bag 18 are a plurality of heat laminated junctures 54 that improve the strength of the laminated materials 48, which may vary in size and quantity depending upon the particulate to be captured (filtered from the fluid).

Figure 3:
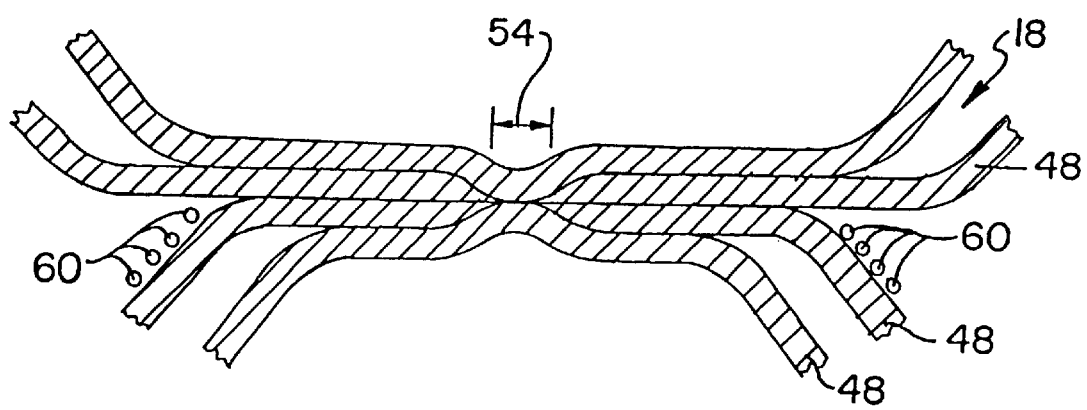
FIG. 3 is a partial broken away cross-sectional view, of a filter bag used in the pressurized filter vessel shown in FIG. 1 with the layers of the filter bag folded back to determine the layer blinded by the particulate appearing in the sample liquid that flowed through the filter bag.

Referring now to FIG. 3, which is a partial broken away cross-sectional view, of a filter bag that 18 that is being examined to determined the porosity of the filter material 48 that captured the particles 60. Determining the porosity of the filter material needed to capture unwanted particulate can serve two functions. Firstly, it insures the quality of the fluid purchased when a sample is tested and secondly, it prevents using filters of smaller porosity than needed, which reduces down time to replace a filter that has become blinded, when a larger porosity filter would be acceptable.

In operation, the filter bag 18 is placed into the filter basket 16, which is inserted into the filter vessel housing 12 and the cover is closed and sealed by the cover clamping mechanisms 34 and 36. A sample run is made to determine which filter layer has been blinded by particles captured by a particular filter layer. This is determined by removing the filter bag 18 from the filter housing vessel 12 and cutting the filter bag 18 at any angle relative to the longitudinal axis 62 of the filter bag 18 and viewing, by a non-assisted visual examination, each layer 48. Once a determination is made as to which layer 48 has been blinded, the required filter bag porosity can be determined to minimize down time and maintain the quality of the fluid being purchased.

Hereinbefore has been disclosed an apparatus and a simple, economical and rapid method, for determining the size of contaminate particles disposed within the fluid being filtered in the filter vessel. It will be understood that various changes in the method detail, materials, arrangements of parts and operating conditions, which have been herein described and illustrated in order to explain the nature of the invention may be made by those skilled in the art within the principles and scope of the instant invention.

Having thus set forth the nature of the invention, what is claimed is:

1. A simple, economical and rapid method for determining if the contaminate particle size appearing in a relatively large amount of fluid to be filtered is acceptable, by filtering only a relatively small sample thereof, comprising the steps of:
   A. providing a pressurized filter housing vessel having an input port and an output port;
   B. providing a filter basket adapted to be received by said filter housing vessel;
   C. providing a multi-layered laminated filter bag, each layer of filter material having a different porosity rating, adapted for insertion into said filter basket;
   D. permitting a sample of said fluid to be filtered, to flow through said filter bag under pressure;
   E. removing said multi-layered laminated filter bag from said filter vessel housing after said fluid has flowed therethrough; and
   F. cutting said multi-layered laminated filter bag at an angle to the longitudinal axis of said filter bag to determine, by a non-assisted naked eye visual examination, the layer of said filter material that has trapped the major portion of said contaminating particles.

2. The method according to claim 1, wherein said filter housing vessel input port is disposed above the top of said filter bag and may exit only, via said filter housing vessel output port, which is disposed below said filter bag.

3. The method according to claim 1, wherein only a sample portion of said fluid to be filtered is utilized.

4. The method according to claim 1, wherein said multi-layered laminated filter bag is provided with at least three layers of filter material laminated together.

5. The method according to claim 1, wherein said multi-layered laminated filter bag is provided with a plurality of filter materials laminated together.

6. The method according to claim 5, wherein said multi-layered laminated filter bag is provided with a plurality of filter materials laminated together, with the porosity rating of each layer being selected to monitor for the content of a particular particle size in the fluid being filtered.

7. The method according to claim 5, wherein said multi-layered laminated filter bag is provided with a plurality of filter materials laminated together, with the porosity rating of the filter bag being selected to monitor for the content of a particular size in the fluid being filtered.

* * * * *